United States Patent [19]
Lyon

[11] 3,978,747
[45] Sept. 7, 1976

[54] METHOD AND APPARATUS FOR SEVERING REINFORCED ELASTOMERIC TUBULAR ARTICLES

[75] Inventor: Ivan R. Lyon, Galesburg, Ill.

[73] Assignee: The Gates Rubber Company, Denver, Colo.

[22] Filed: Mar. 24, 1975

[21] Appl. No.: 561,400

[52] U.S. Cl................................. 83/18; 83/54; 83/75; 83/169; 83/175; 83/422
[51] Int. Cl.²...................... B26D 3/22; B26D 7/14
[58] Field of Search.................. 83/18, 20, 175, 54, 83/118, 119, 422, 74, 75, 169

[56] References Cited
UNITED STATES PATENTS

| | | | |
|---|---|---|---|
| 2,064,017 | 12/1936 | Leschen............................ | 83/118 X |
| 2,293,721 | 8/1942 | Engler............................... | 83/20 |
| 3,066,564 | 12/1962 | Carpenter........................ | 83/175 |
| 3,222,970 | 12/1965 | Hill.................................. | 83/175 X |
| 3,232,159 | 2/1966 | Stanley............................. | 83/175 |
| 3,468,202 | 9/1969 | Hollis............................... | 83/175 |
| 3,491,637 | 1/1970 | Hasten et al..................... | 83/422 X |

Primary Examiner—Frank T. Yost
Attorney, Agent, or Firm—Curtis H. Castleman, Jr.; Raymond Fink; H. W. Oberg, Jr.

[57] ABSTRACT

Reinforced polymeric tubular articles, e.g., wire braid reinforced hose, are severed into desired lengths by clamping the tubular article in a split fixture, the split portion defining a cutting plane, and preferably advancing the tubular article toward a stationary cutting blade while continuously maintaining tension on the surface of the tubular article being cut by progressively bending the tubular article as it is passed through the cutting blade until fully severed. The apparatus rapidly cuts the reinforced tubular articles very smoothly without binding.

18 Claims, 6 Drawing Figures

3,978,747

METHOD AND APPARATUS FOR SEVERING REINFORCED ELASTOMERIC TUBULAR ARTICLES

BACKGROUND OF THE INVENTION

This invention relates to method and apparatus for severing hose and like tubular articles which contain a reinforcement therein, such as one or more layers of wire braid, which normally create difficult problems in cleanly severing the hose into desired lengths.

A customary method utilized in the past for severing reinforced tubular articles into desired lengths has been to advance the tubular article the desired distance through a split fixture, stop the article at the desired position, and then swing a rotating cutter blade down into and through the tubular article at the split in the fixture thereby severing the hose. In addition to this type of swing cutter, relatively large diameter hoses have been severed by using a stationary rotating blade with the operator manually moving the hose through the blade while grasping the hose on either side of the blade with his hands. In either case, the hose remains essentially linearly oriented or sometimes fixed in a bent configuration while the cut is being made.

While the prior art cutting methods have been more or less satisfactory for severing non-reinforced articles, or articles reinforced with textile or other polymeric materials offering little resistance to cutting, these methods have been found to be faulty particularly with respect to severing of tubular elastomeric materials reinforced with high modulus low elongation material such as wire. The resultant cuts have not been perfectly straight in all instances and there has been a tendency during the cutting process for the tubular article to buckle as a result of the resistance offered the cutting blade by the portion of the reinforcement already severed.

It is a primary objective of the subject invention to provide method and apparatus for severing reinforced polymeric tubular articles whereby a very smooth and perpendicular cut is provided, without buckling, which is accomplished with repeated uniformity of result, and which is rapid in operation.

SUMMARY OF THE INVENTION

Briefly described, in one aspect the method of the invention includes the steps of (1) threading the polymeric tubular article to be severed through a split clamping fixture and then advancing the tubular article the predetermined desired distance through the clamping fixture; (2) clamping the tubular article in the fixture securely so as to prevent longitudinal displacement thereof; (3) bending the tubular article in the area immediately proximate to a cutting means disposed opposite the split in the fixture, and to define a concavo-convex arc surface while simultaneously advancing the convex portion of the surface into contact with the cutting means; and (4) further bending the tube while maintaining tension on the convex portion of the tube so that the concavo-convex arc defined thereby is determined by a progressively smaller radius, while simultaneously further advancing the convex portion of the surface into the cutting edge progressively until the tube is fully severed.

The apparatus for performing the above method comprises (1) fixture means for receiving the tubular article including a pair of longitudinally spaced and relatively movable tube accepting portions which have internal dimensions greater than the outer diameter of the tubular article; (2) means associated with the receiving fixture for clamping the tubular article in the accepting portions of the receiving fixture, preventing longitudinal displacement thereof when in the clamped position; (3) cutting means; (4) means for splitting the tube accepting portions progressively apart and simultaneously for progressively tilting the tube accepting portions to form respective acute angles to the cutting blade plane; and (5) means for advancing the tubular article in its clamped position in the tube accepting portions of the fixture means toward the cutting blade and for forming the concavo-convex disposition of the tubular article as it is being severed, the concavo-convex surface being determined by an arc whose radius progressively decreases as the tubular article progressively penetrates into the cutting blade.

BRIEF DESCRIPTION OF THE DRAWINGS

The invention will be more particularly described with reference to the accompanying drawings, wherein like parts are designated by the same reference numerals, and in which.

PREFERRED EMBODIMENTS OF THE INVENTION

The invention applies to the severing into various lengths of reinforced polymeric articles of generally tubular configuration. The preferred polymeric materials are at least substantially elastomeric in nature. Elastomeric materials include the class of materials which are characterized by a high degree of elasticity, resilience, or rebound capability upon the removal of a deforming force. Examples of typical elastomeric materials contemplated include rubber or rubber-like materials such as natural rubber, synthetic rubbers such as SBR, and neoprene, thermoplastic elastomers such as ethylene-propylene terpolymers, polyurethanes, silicones, foamed polyvinyl chlorides, and the like. The reinforcement may be in the form of a braid, spiral, knit, or wrap, for instance, either embedded within the article or formed along or near its surface. While the invention applies to the severing of various types of reinforced tubular articles, the invention provides the most advantages when the reinforcement is made of a high modulus low elongation material such as wire. Other typical reinforcements include fabric, cords, filaments or staple nylon, polyester, aramid and rayon.

Figures 1, 6:
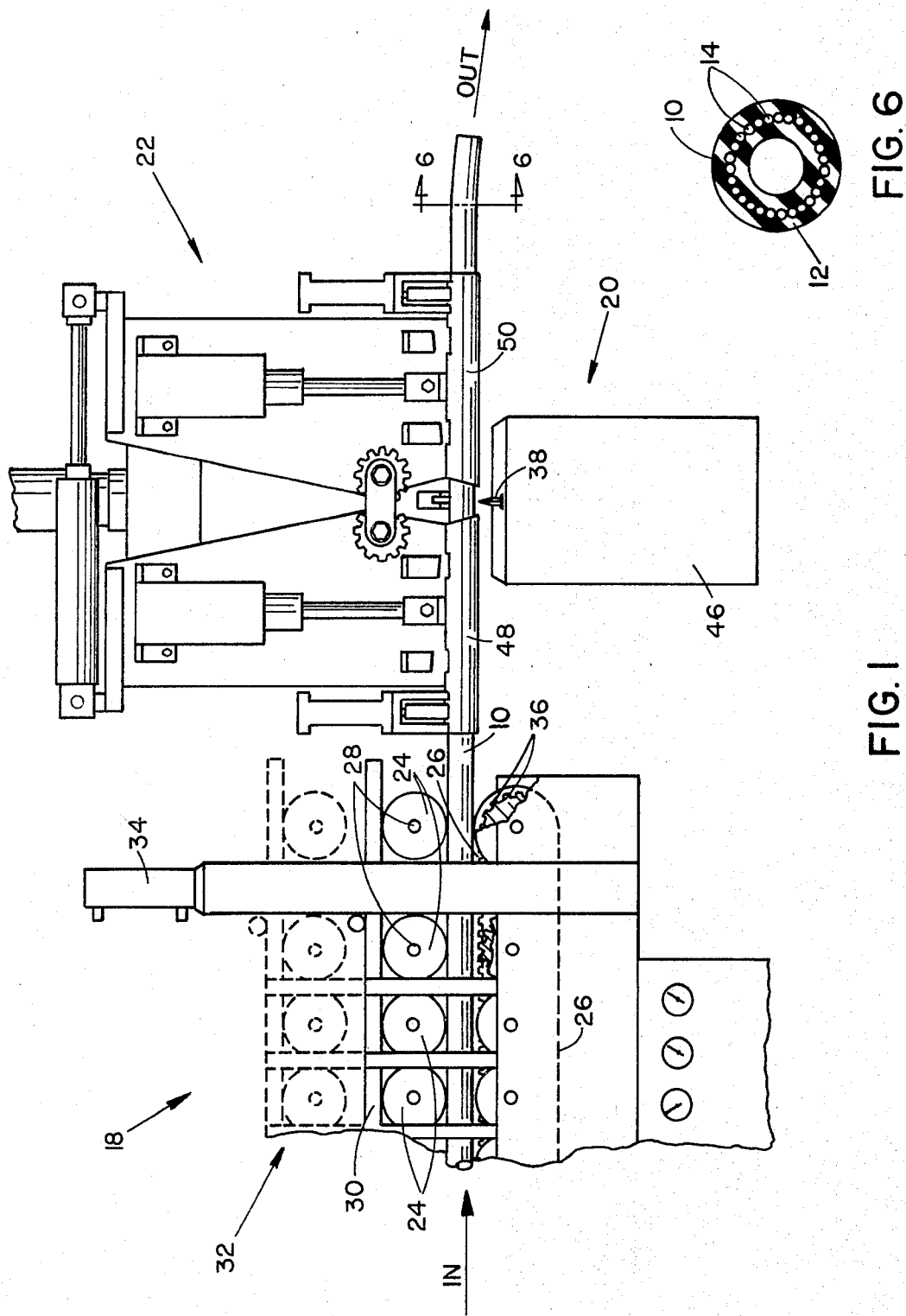
FIG. 1 is an overall view of the assembly cutting apparatus showing the conveying mechanism as well as the cutting head mechanism.
FIG. 6 is a cross-section taken along section 6—6 of FIG. 1 depicting a typical hydraulic hose.

For purposes of illustration, the reinforced tubular article illustrated in the drawings in FIG. 6 is a hose article 10 having a rubber matrix body 12 (which encompasses both the tube and cover) in which is embedded a single ply of wire reinforcement 14. The hose is built in known manner by extruding the inner tube, applying the reinforcement over the exterior of the tube, extruding the cover over the reinforced tube, and then vulcanizing the resulting article to form an integral hose body in which the reinforcement is throughly embedded in vulcanized rubber. Clearly, a plurality of layers of reinforcement, either adjacent one another or spaced apart, may be employed and still benefit from the subject method of severing the hose into desired lengths.

Figure 2:
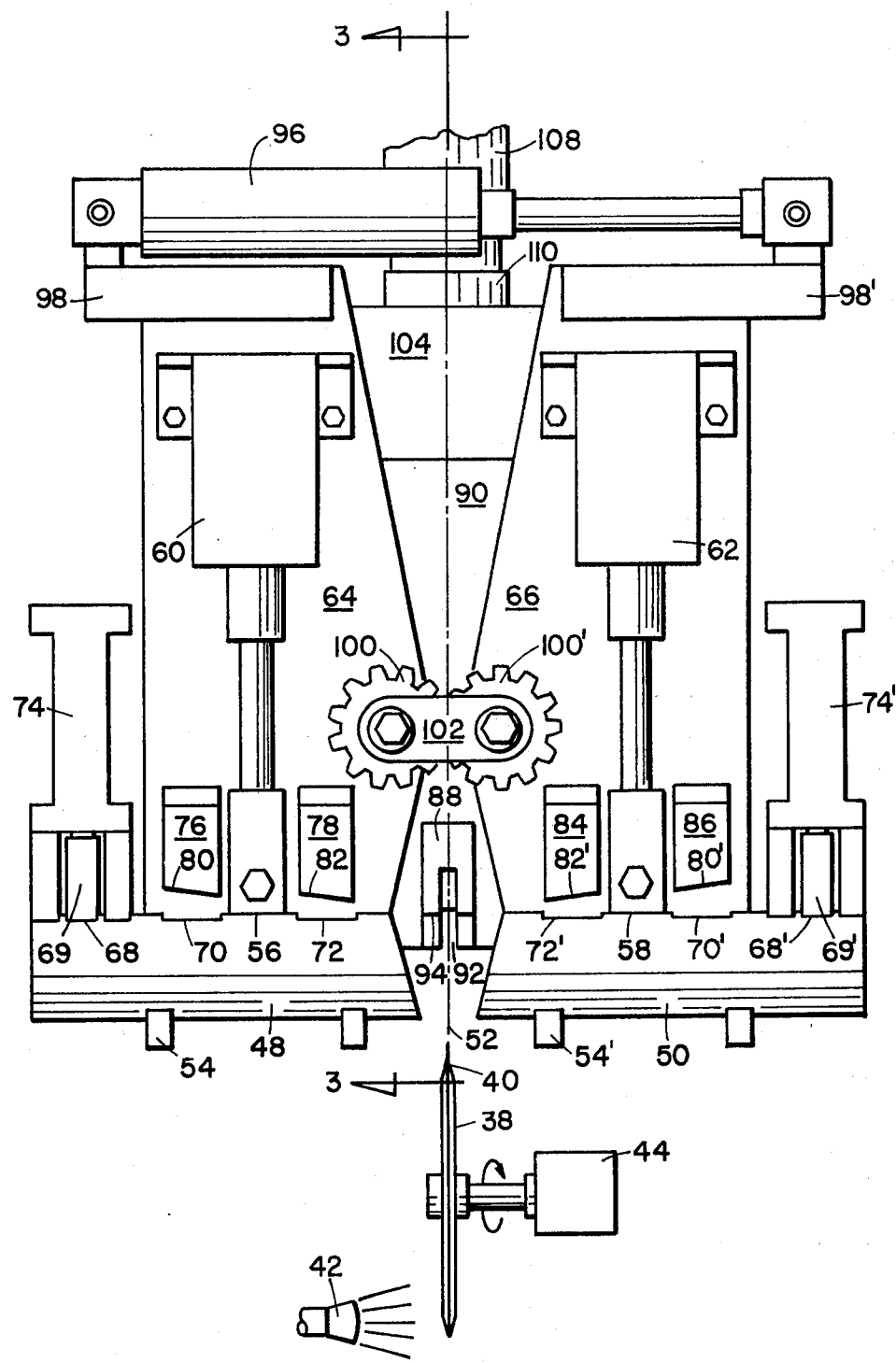
FIG. 2 is a close-up view of the cutting head mechanism.
Figure 3:
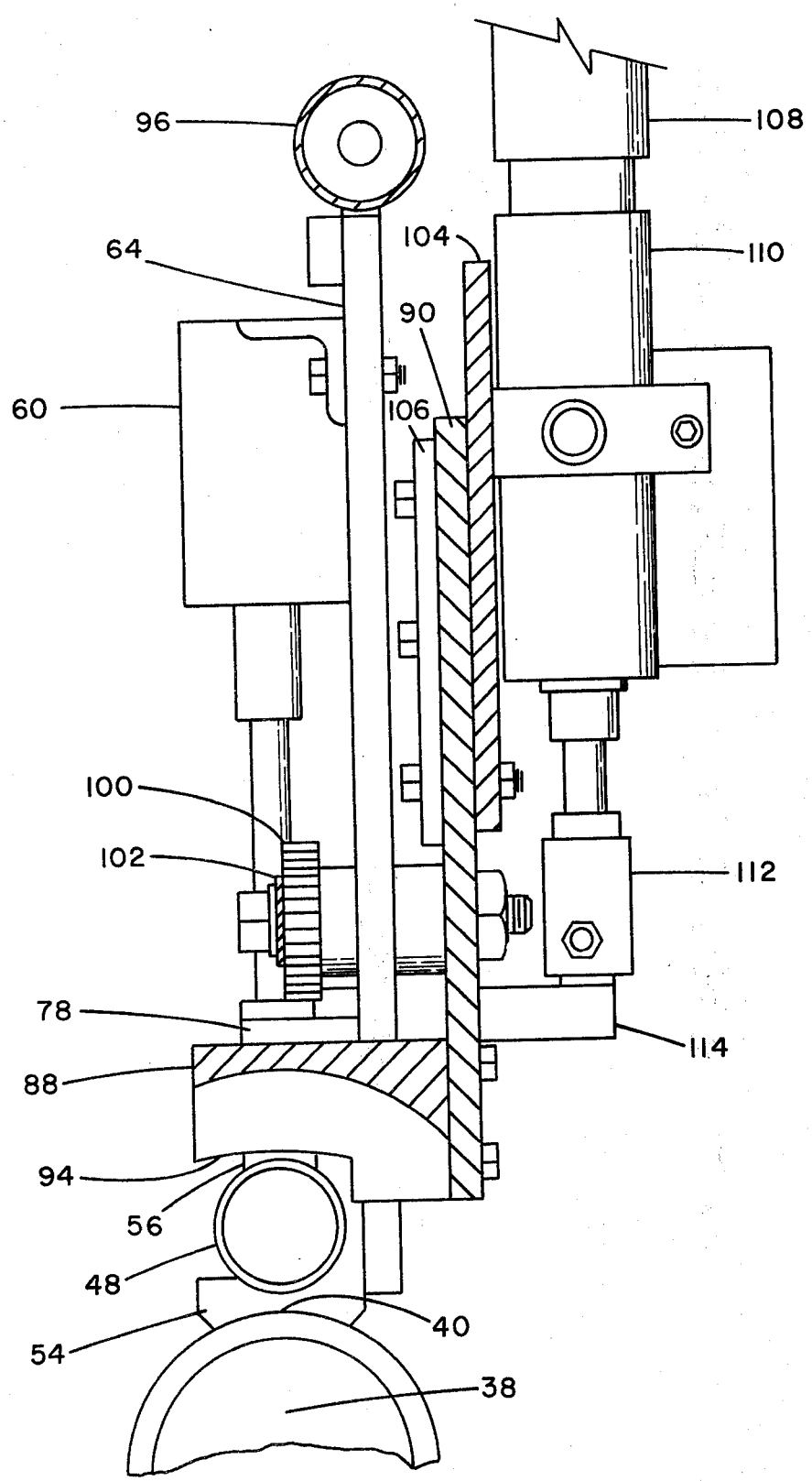
FIG. 3 is a partial sectional view taken along section 3—3 of FIG. 2 of the cutting head.

Referring particularly to FIGS. 1–3, the apparatus for automatically severing the hose 10 into desired lengths is divided into three basic parts, the feeding system generally shown at 18, the cutting mechanism shown at 20 and the cutter head assembly at 22. Each of the feeder, cutter and cutter head assemblies are mounted on a suitable frame weldment, which has been omitted from the drawings for purposes of clarity.

The feeder mechanism 18 comprises upper guide rollers 24 and a lower driven belt 26. The rollers 24, while rotatable about their respective axes 28, are mounted on to a top plate 30. The rollers and top plate 30 are movable between a lower, pressure applying position as shown in solid in FIG. 1, to an upper, free position shown in phantom generally at 32. In the lower position the individual rollers apply direct pressure to the top of the hose 10. Logic controlled air cylinder 34 reciprocally switches the plate and roller assembly between its upper and lower positions.

The hose 10 is driven on its underneath surface by the endless belt 26 when rollers 24 are positioned contiguous to the hose in pressure applying relationship. The belt is preferably of a positive drive type having teeth or cogs spaced along its inner peripheral surface which engage and cooperate with teeth 36 of a set of drive sprockets. At least one of the sprockets is provided with a suitable source of power to drive the belt about the sprockets.

The cutting mechanism 20 is preferably stationary and mounted to the frame weldment and includes a rotatable cutting blade 38 having a cutting edge 40. A water spray 42 is mounted in the vicinity of the cutting edge 40 to cool the blade and increase its life. A saw blade which has been found to be satisfactory in practice for severing wire braid hose is a circular, high-speed tool steel 3/32 inches thick and 14 inches in diameter. The saw is preferably powered by hydraulic motor 44. At least the cutting blade portion is preferably housed within a protective shielding 46, shown in FIG. 1, for the safety of the operator.

The cutter head 22, referring to FIGS. 2 and 3, generally includes a fixture for receiving the hose, means for clamping the hose within the fixture, and means for bending the hose into a concavo-convex surface which hose, while its convex surface is advanced (relatively) toward the cutting blade 38, is progressively bent so as to be defined by an arc whose radius is also progressively decreasing preferably monotonically as the cut is being made.

The fixture means includes a pair of relatively movable tube accepting portions 48, 50 which are longitudinally spaced apart, bisected by the theoretical cutting plane 52 normal to the axes of the tube accepting portions. The tube accepting portions 48, 50, which in this case are guide tubes, are normally in line with the conveyor feeder when the hose is being indexed as shown in FIG. 1. The guide tubes are cradled in lower supports 54, 54' and attached at their upper surface at 56, 58 through linkage to respective piston/cylinders 60, 62 which are fixedly mounted respectively on bifurcated plates 64, 66.

In the top portion of the guide tubes 48, 50 are formed a series of openings 68, 70, 72, 72', 70', 68'. The opening 68, 68' receive clamping pistons or locks 69, 69' respectively actuated by piston/cylinders 74, 74'. The openings 70, 72 accommodate clamping guide blocks 76, 78 which are mounted to plate 64 and which have lower inclined surfaces 80, 82 against which the top of hose is clamped when the cutter head is in the position shown in FIG. 4. Similarly, mirror image guide blocks 84, 86 with inclined surface 82', 80' are provided above the openings 72', 70' in guide tube 50.

Figure 4:
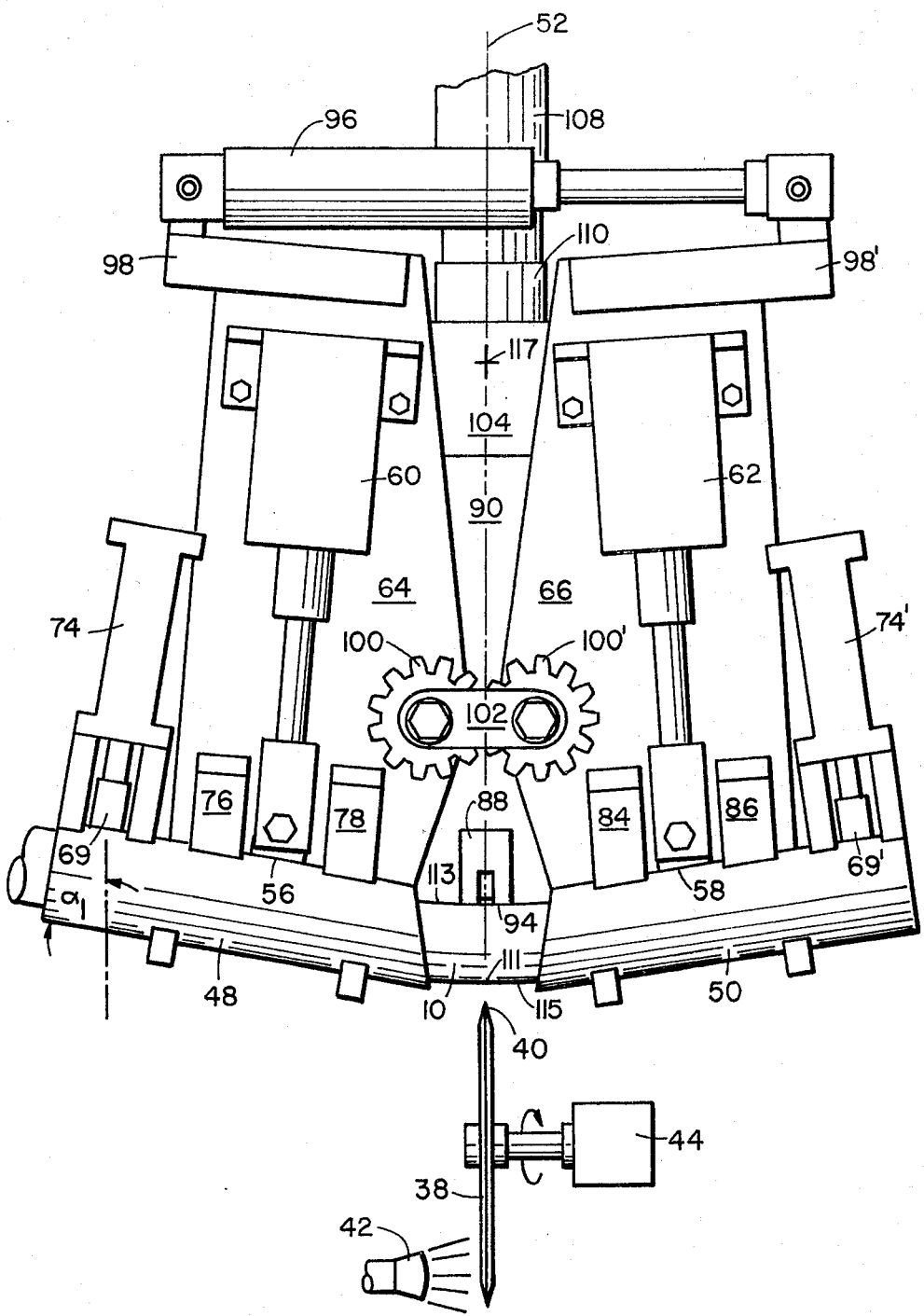
FIG. 4 is a view similar to FIG. 2 showing the tubular article inserted in the clamping fixture and clamped into position.
Figure 5:
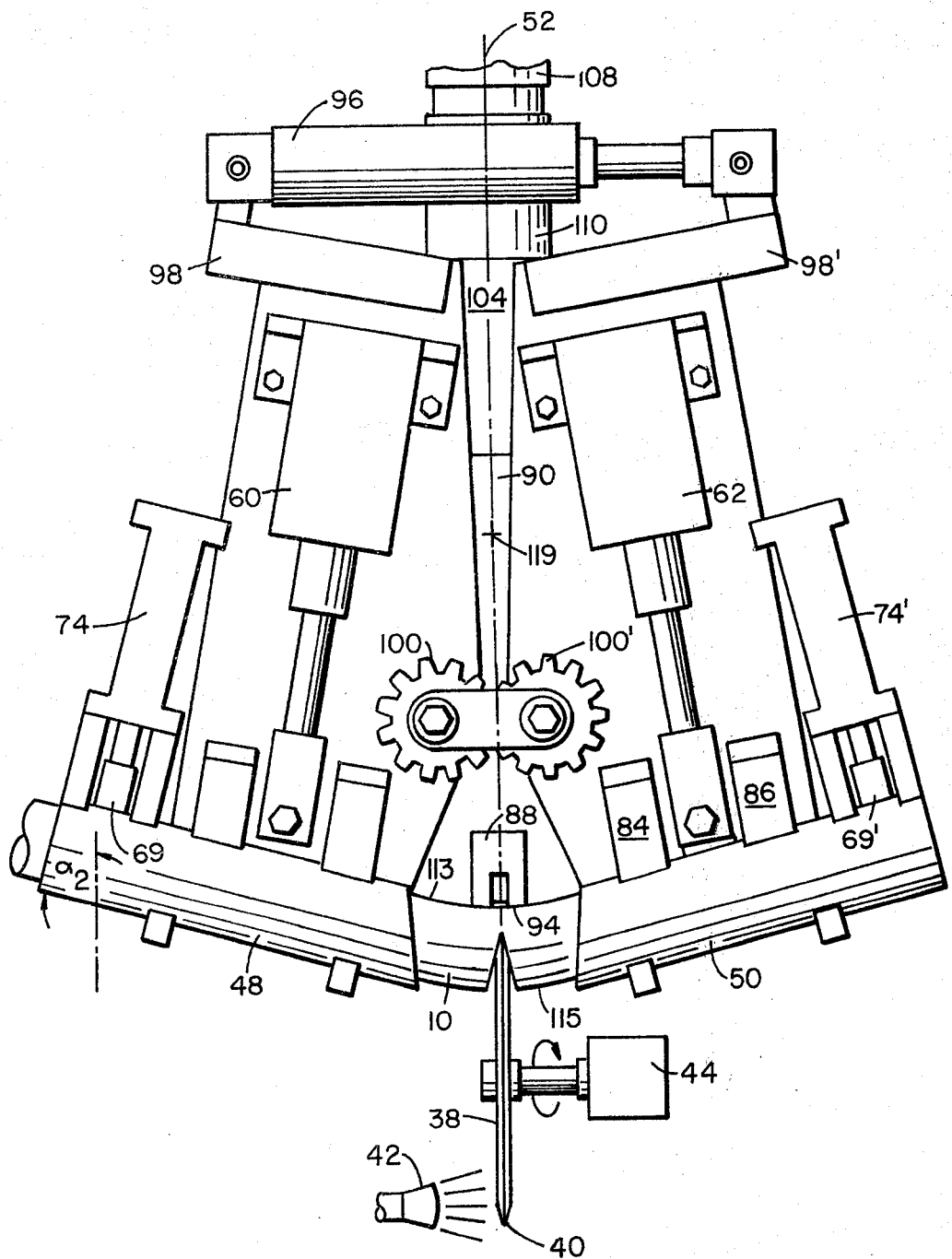
FIG. 5 is a view depicting the operation of the cutter head mechanism showing the tubular article partially severed.

A split mandrel 88 is mounted to plate 90 and straddles the cutting plane 52. A slot 92 is provided to accommodate the cutting blade 38. An anvil surface 94 bears against portions of the hose adjacent the cutting plane when in the clamped and cutting positions, as shown in FIGS. 4 and 5.

The plates 64, 66 are relatively rotatable by the actuation of piston/cylinder 96 pin connected through the linkage 98, 98' to the plates 64, 66. Rotation is accomplished about meshing spur gears 100, 100', affixed to each of the plates 64, 66 and tied together by connecting plate 102.

The entire frontal assembly comprising the plates 64, 66, guide tubes 48, 50, piston/cylinder 96 and rear connecting plate 90, etc., are slidably attached to and reciprocally movable in a vertical direction with respect to rearmost plate 104 (fixed to the frame) with the aid of shoulder guides 106 mounted on juxtaposed sides of plate 90 and attached to rearmost plate 104. Tandem air cylinder 108 and oil-filled cylinder 110 provide vertical reciprocal motion to plate 90 via linkage 112 in a manner recognizable to those skilled in the art. In this regard, arm 114 is attached to plate 90. Note that the tandem cylinder and linkage arrangement at the backside of the cutting head has been shown unsectioned for clarity.

In operation, initially the plate 30 and roller 24 assembly is in the down position which, together with the lower driven belt 26 applies pressure to the hose in parallel horizontal planes at the upper and lower surfaces of the hose, respectively. As the belt drive sprocket is actuated, by a suitable hydraulic motor, for instance, the belt conveys the hose toward the cutter head mechanism 22. The hose is threaded through the split fixture 48, 50 and then conveyed through and beyond the cutting head a predetermined distance based upon the length of hose segment desired. The hose length may be measured automatically by controlling and monitoring the output torque of the hydraulic motor which drives the conveyor belt. The conveyor can be made to stall before the hose slips on the conveying belt so that accuracy in measurement is obtained. Measurement may be accomplished automatically by counting and stopping the rotation of a lever arm (not shown), for instance, which may be affixed to a gear being driven by the conveyor. The arm will rotate from the "go" position to a mechanical stop, which is supported by logic controlled air cylinders. The stop location may be made adjustable around the periphery of the rotating arm for access by an operator to set up the desired length of hose to be cut.

After the hose has been advanced through the cutting head mechanism 22 the predetermined distance, the conveyor stops and the hose is now ready for clamping. This is accomplished initially by upward movement of the plate and roller assembly to position 32. The hose is clamped by actuation of cylinders 74, 74′ whereby clamping pistons 69, 69′ are advanced downwardly to the position shown in FIG. 4. These pistons securely clamp and hold the hose within the tubes 48, 50. Cylinders 60 and 62 are then actuated, the pistons therein moving upwardly, whereby the guide tubes 48 and 50 are brought upwardly and canted to an acute angle from their original horizontal position, as determined by the hose encountering the beveled surfaces of the guides 76, 78, 84, 86. The upper surface of the hose in the clamped position intimately follows the beveled surfaces 80, 82, the anvil surface 94, and surfaces 82′ and 80′.

At this point, the cutting cycle begins. In this respect, piston/cylinder 96 is actuated and plates 64 and 66 begin to rotate toward one another about beveled gears 100, 100′, as shown in FIG. 4. Simultaneously with the actuation of piston/cylinder 96, or slightly thereafter, tandem cylinders 108, 110 are actuated to provide a downward translatory motion to the entire front portion of the assembly (e.g., plates 64, 66, plate 90 and the clamped tubular article) so that the hose is advanced in the direction of the cutting plane 52 toward the cutting edge 40.

As the entire carriage assembly is being advanced downwardly toward the cutting surface, the piston/cylinder 96 continues to contract to cause the plates 64 and 66 to rotate toward one another as will be seen from comparing FIGS. 2, 4 and 5. As the point of severence 111 of the hose comes into contact with and senses the cut-off saw blade, the guide tubes 48 and 50 accelerate the bending of the tube, thereby defining a concavo (113)-convex (115) surface whose arc of curvature is determined by centerpoint 117 just prior to cutting contact, and a shorter arc of curvature determined by centerpoint 119 as the hose moves into the cutting blade to the extent shown in FIG. 5. This arc of curvature is progressively defined by a shorter radius as the hose progressively moves through the cutting blade and as piston/cylinder 96 further contracts. Thus, whereas guide tube 48 initially is horizontal, it is thereafter canted upwardly in to the early clamping position as shown in FIG. 4, defining an angle alpha $_1$ with respect to the vertical. In FIG. 5 the canting has progressed to define an angle alpha $_2$ with the vertical, alpha $_2$ being less than alpha $_1$. In general the angle alpha decreases proportionally with the extent of severence of the hose by blade 38.

The continued bending of the hose in the area of severence while it is clamped maintains tension on the surface of the hose portion being cut and has been found to result in a very straight cut without encountering buckling or other interference from the hose. Not only are the elastomeric portions of the tubular article maintained under tension during the cutting operation, but also the reinforcement, which is intimately bonded to the elastomeric material, is also maintained under such tension. This further facilitates severence of the reinforcement without binding, as the severed portions of the reinforcement are pulled apart as they are being cut, sufficiently so as not to interfere with the further cutting of the reinforcement portion in advance of the cutting edge.

In a preferred alternative embodiment, the bending of the hose 10 is controlled by a pressure sensing system which is responsive to the degree of resistance offered by the hose during the course of its being severed. In one means for implementing this embodiment which has been found to be useful in practice, the bending of the hose 10 is controlled by the pressure rise sensed by a pressure switch associated with the hydraulic motor 44 powering cut-off saw 38. Pressure rise is sensed as the blade 38 contacts and penetrates the hose 10. The pressure switch actuates a cylinder air valve (not shown) causing piston/cylinder 96 to bend the hose more severely and also slows down the movement of the hose (via actuation of tandem cylinder 108–110) into the blade. Thus, if a relatively stiff hose with numerous layers of wire reinforcement are encountered by the blade, a large pressure rise will be sensed from the highly loaded blade, and hence piston/cylinder 96 will increase the bending of the hose and the translatory downward movement of the entire carriage assembly will be slowed. In this embodiment bending of the hose may not be initiated until the cut-off blade actually senses the surface of the hose at 111, i.e., the clamping step may not necessarily include bending as a portion thereof.

The amount of bending may also be controlled by the operator by manually selectively adjusting the controls mounted on the main console shown at the lower left of FIG. 1.

After the cut is complete, the severed length of hose is withdrawn toward the right and recovered for further processing. The leftmost, remaining portion of the hose is then unclamped, the pistons 60 and 62 actuated to return the split fixture into the horizontal position shown in FIGS. 1 and 2, the clamping pistons 69, 69′ retracted, and the tandem pistons 108 and 110 retracted to produce the initial position. The plate 30 and roller 24 assembly is then lowered to the position of FIG. 1, grasping the hose, and the cycle is then ready for repeating. It will be appreciated that the apparatus will sever various hose sizes as long as the outside diameter of the hose is less than the inside diameter of the guide tubes.

It should be understood that the invention is capable of a variety of modifications and variations which will be made apparent to those skilled in the art by a reading of this specification, and which are intended to be within the sphere of the invention as claimed hereafter. For instance, while the method has been described with respect to a stationary cutting blade and a movable as well as a bendable cutting head, it is the relative motion between the cutting head and cutter blade while maintaining the desired bending-induced tension on the outer surface of the hose which is relevant. Clearly, the cutting head could be made to merely apply the bending or rotational segment of the motion, and the cutting blade could be programmed to move upwardly through the convex portion of the concavo-convex surface of the hose while continuously maintaining tension on the convex surface.

What is claimed is:

1. A method for severing reinforced polymeric generally tubular articles into predetermined lengths comprising:
   threading the tubular article axially through a clamping fixture normally having an internal dimension which is greater than the outer diameter of the tubular article, said clamping fixture having longitudinally spaced portions between which is defined a cutting plane substantially normal to the longitudinal disposition of the tubular article;

advancing the tubular article a predetermined distance through the clamping fixture;

clamping the tubular article in the fixture so as to hold it securely, preventing longitudinal displacement thereof;

while continuing to clamp the tubular article as specified above, bending the tubular article in the area immediately proximate to the cutting plane to define a concavo-convex arc surface while simultaneously advancing the convex portion of the concavo-convex surface into contact with a cutting means disposed along the cutting plane;

further bending the tubular article and stretching both the concavo and convex portions of the article longitudinally so that the concavo-convex arc defined thereby is determined by a progressively smaller radius while simultaneously further longitudinally stretching the article and advancing the convex portion of the concavo-convex surface into the cutting means progressively until the tubular article is fully severed.

2. The method of claim 1 including the additional step of:

conveying the tubular article in advance of the clamping fixture through juxtaposed pressure means applying pressure on opposite sides of the tubular article and said pressure means rotatable so as to convey said tubular article toward the clamping fixture at a predetermined rate.

3. The method of claim 1 wherein said polymeric tubular article is a wire reinforced hose.

4. The method of claim 1 wherein said clamping fixture is composed of a pair of elongated tubes forming said longitudinally spaced portions.

5. The method of claim 1 wherein said bending of the tubular article is accomplished by rotating said longitudinally spaced portions of the clamping fixture away from said cutting plane.

6. The method of claim 1 wherein bending of the tubular article is not commenced until the article comes into contact with the cutting means, and subsequent rate of bending of the hose is controlled by the degree of resistance offered by the reinforced tubular article as sensed by the cutting means.

7. A method for cutting a reinforced polymeric generally tubular article into separate portions comprising the steps of:

grasping said tubular article at spaced apart points and securely clamping the article at these points;

while continuing to grasp the article as specified above, bending the tubular article intermediate the spaced points so as to define a concavo-convex arc surface determined by a first radius;

moving a cutting means, disposed along a cutting plane situate immediate said points, and the convex portion of the concavo-convex surface into cutting relationship contact;

continuously stretching both the concavo and convex portions of the article longitudinally and maintaining tension longitudinally of the tubular article as it is being cut by the cutting means, said concavo-convex surface being defined by an arc which is determined by a radius which is made progressively smaller than said first radius, and simultaneously further engaging the convex portion of the concavo-convex surface with the cutting means progressively until the tubular article is fully severed.

8. The method of claim 7 wherein the cutting means is a generally stationary cutting blade rotatably mounted and the tubular article is advanced toward the rotating cutting blade.

9. The method of claim 7 wherein the cutting means is moved toward said concavo-convex surface, the portion of the tubular article situate along the cutting plane being substantially fixed relative to the cutting means.

10. Apparatus for severing reinforced elastomeric generally tubular articles into predetermined lengths comprising:

fixture means for receiving the tubular article including a pair of longitudinally spaced and relatively movable tube accepting portions between which is defined a cutting plane normal to the longitudinal disposition of the tubular article, said accepting portions having internal dimensions greater than the outer diameter of the tubular article;

means associated with said receiving fixture for clamping the tubular article in the accepting portions of the receiving fixture, preventing longitudinal displacement thereof;

cutting means having a cutting edge rotatable in said cutting plane;

means for splitting said tube accepting portions progressively apart substantially longitudinally with respect to the disposition of the tubular article, and simultaneously for progressively tilting said tube accepting portions to form respective acute angles to the cutting plane; and means for moving the cutting means and the tubular article in its clamped position in the tube accepting portions of the fixture means into cutting relationship, so adapted and arranged that the tubular article forms a concavo-convex surface as it is being severed, such surface determined by an arc whose radius progressively decreases as the tubular article is progressively cut.

11. The apparatus of claim 10 wherein there is additionally included:

conveying means for conveying said tubular article toward said fixture means, said conveying means comprising first and second rotatable members adapted to apply pressure to opposite sides of the tubular article and upon rotation thereof advance the hose toward the fixture means.

12. The apparatus of claim 11 wherein said rotatable members comprise at least one endless power transmission belt driven about at least a pair of spaced sprockets, said belt applying intimate pressure to one side of said tubular article.

13. The apparatus of claim 10 wherein said fixture means comprises a pair of spaced tubular members having at least one aperture in each of said longitudinally spaced tube accepting portions for receipt of said clamping means.

14. The apparatus of claim 13 wherein said tubular fixture means have respective longitudinal axes said tubular fixture means being rotatable with respect to said cutting plane so that their respective axes form acute angles with respect to the cutting plane.

15. The apparatus of claim 10 wherein said clamping means comprises cylinder actuated pistons which grasp the tubular article through apertures formed in the upper surface of said tube accepting portions of the fixture means.

16. The apparatus of claim 10 wherein said splitting means includes a pair of base plates pivotally rotatable one with respect to the other and on which the tube accepting portions are mounted at the lower portion of said plates.

17. The apparatus of claim 10 wherein said moving means include a vertical slidable plate actuatable by piston means and to which the fixture means are attached whereby the tubular article is advanced or retracted in the direction of the cutting plane as desired.

18. The apparatus of claim 10 additionally including pressure sensing means, responsive to the resistance offered by the tubular article as it is being severed by the cutting means, for simultaneously and individually controlling the splitting speed of the splitting means and the moving speed of the moving means.

* * * * *